G. S. JOHNSTON.
VEHICLE HEATER.
APPLICATION FILED JAN. 31, 1910.
969,784.
Patented Sept. 13, 1910.
2 SHEETS—SHEET 1.
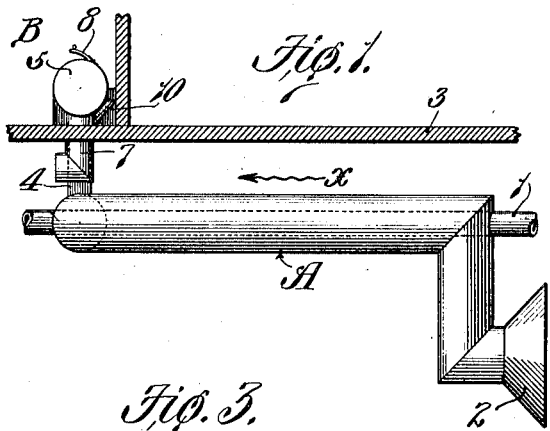
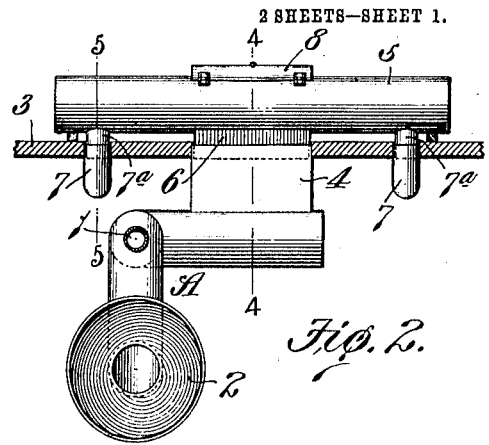
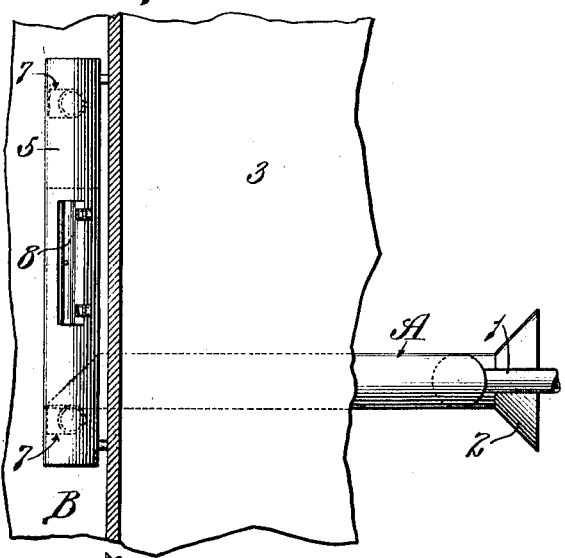
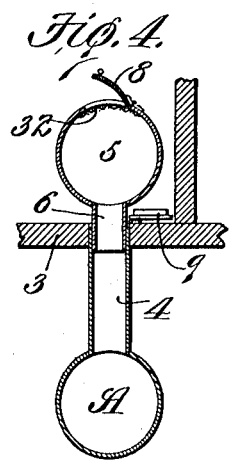
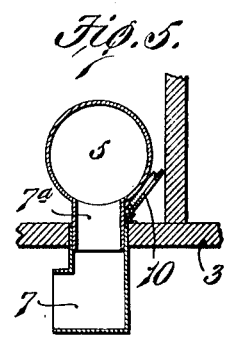
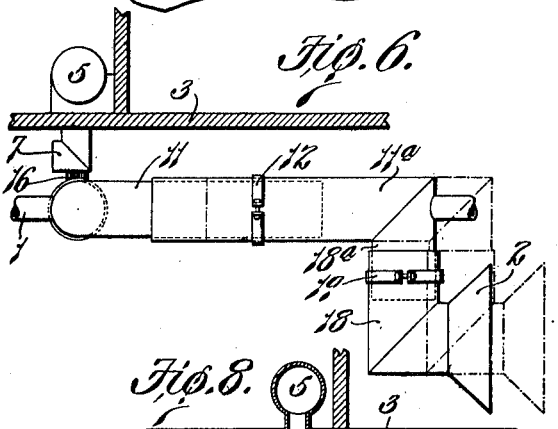
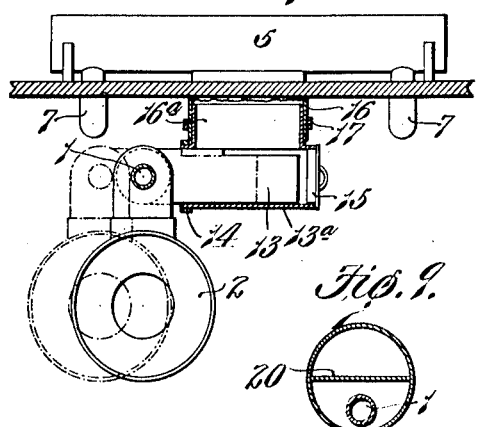
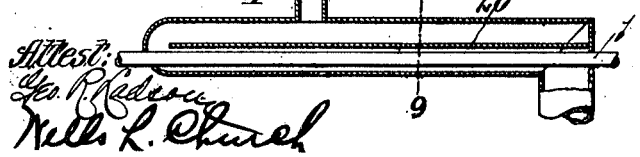
Inventor:
George S. Johnston.
By Paul Bakewell
Atty.

G. S. JOHNSTON.
VEHICLE HEATER.
APPLICATION FILED JAN. 31, 1910.
969,784.
Patented Sept. 13, 1910.
2 SHEETS—SHEET 2.
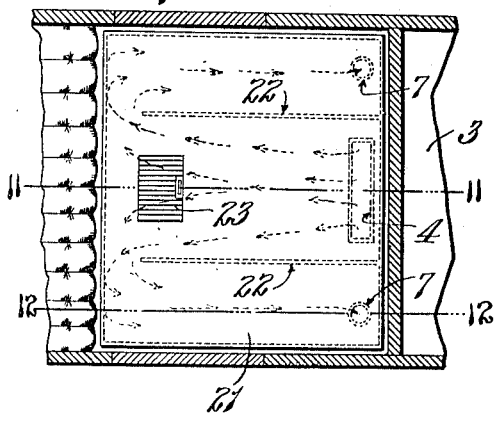
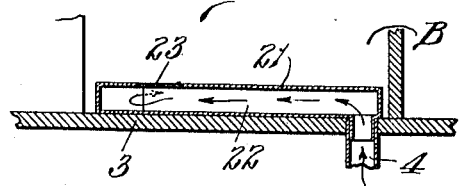
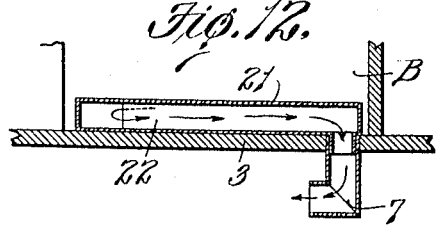
Attest:
Geo. R. Ladson
Wells L. Church
Inventor:
George S. Johnston.
By Paul Bakewell
Atty.

UNITED STATES PATENT OFFICE.

GEORGE S. JOHNSTON, OF ST. LOUIS, MISSOURI.

VEHICLE-HEATER.

969,784.

Specification of Letters Patent.   Patented Sept. 13, 1910.

Application filed January 31, 1910. Serial No. 541,040.

*To all whom it may concern:*

Be it known that I, GEORGE S. JOHNSTON, a citizen of the United States, residing at St. Louis, Missouri, have invented a certain new and useful Improvement in Vehicle-Heaters, of which the following is a full, clear, and exact description, such as will enable others skilled in the art to which it appertains to make and use the same.
This invention relates to heaters such as are used in vehicles.

One object of my invention is to provide means for utilizing the exhaust pipe of an engine to heat a compartment of the vehicle which the engine propels, or to heat a radiating device arranged in a compartment of the vehicle.

Another object is to provide a vehicle-heating device of simple construction which is so designed that a current of hot air is supplied to a compartment of the vehicle or to a heat-radiating device arranged in said compartment.

Another object is to provide a vehicle heater that costs nothing to operate, and which is so designed that it is not apt to get out of order, and still another object is to provide a vehicle heater that can be manufactured at low cost and applied easily to different kinds of vehicles.

Other objects and desirable features of my invention will be hereinafter pointed out.

Figure 1 of the drawings is a side elevational view of my improved heater arranged in operative position on a vehicle; Fig. 2 is an end view of the parts shown in Fig. 1; Fig. 3 is a top plan view; Figs. 4 and 5 are vertical sectional views taken on the lines 4—4 and 5—5, respectively, of Fig. 2; Fig. 6 is a side elevational view of an adjustable heater; Fig. 7 is an end view of same partly in vertical section; Fig. 8 is a vertical sectional view of a slightly modified form of my invention; Fig. 9 is a cross sectional view taken on the line 9—9 of Fig. 8; Fig. 10 is a top plan view of a different form of radiating device from that shown in Fig. 1; and Figs. 11 and 12 are vertical sectional views taken on the lines 11—11 and 12—12 of Fig. 10.

Broadly stated, my invention consists in means for causing a current of air to travel adjacent to the exhaust pipe of a vehicle engine and then to pass into a compartment of the vehicle or into contact with a heat-radiating device arranged in the compartment.

The means that I prefer to use for causing a current of air to travel adjacent to the exhaust pipe consists of a conduit through which the exhaust pipe extends, said conduit being mounted on the vehicle in such a manner that a current of air travels through same when the vehicle is in motion. One end of said conduit communicates with a compartment of the vehicle or with a heat-radiating device arranged in said compartment so that the heated air can pass directly into the compartment or into said heat-radiating device and thus warm the occupants of the compartment.

Referring to Fig. 1 of the drawings which illustrates one form of my heater, A designates a conduit having a horizontally disposed portion through which the exhaust pipe 1 of a vehicle engine passes, and a downwardly extending portion that carries a funnel 2 that is arranged in such a manner that a current of air will enter same and travel through the conduit in the direction indicated by the arrow $x$ in Fig. 1 when the vehicle is in motion. The conduit A is preferably arranged under the floor 3 of the vehicle, and the rear end of said conduit communicates with a flue 4 which projects upwardly through the floor of a compartment B of the vehicle, as shown in Figs. 1 and 2. Various forms of heat-radiating devices can be arranged in the compartment B in communication with the flue 4, or, if desired, the heated air can pass directly from the flue 4 into the compartment B. In the form of my invention illustrated in Figs. 1 and 2, a tubular-shaped radiating device 5 is arranged in the compartment B adjacent the floor thereof so that it will serve as a foot-warmer for the occupants of the compartment. Both ends of the device 5 are closed, and said device is provided with a flange 6 that telescopes inside of the flue 4, as shown in Fig. 2, the cross sectional area of said flue 4 being preferably the same as the cross sectional area of the conduit A so as to provide a passageway of uniform area for the heated air. Exhaust flues 7 are arranged adjacent the ends of the radiating device 5 so as to permit the air to escape therefrom and thus provide a continuous circulation of air through the conduit A and the radiating device 5. The exhaust flues 7 project downwardly through the floor of the compartment B so as to prevent the heated air from passing directly into the compartment B when the device 5 is used merely as a foot-warmer. It is sometimes desirable to have the heated air pass directly into the compartment B and I have therefore provided the radiating device 5 with a cover or door 8 that can be raised, as shown in Fig. 1, so as to permit the heated air to pass into the compartment B instead of circulating through the device 5 and escaping through the exhaust flues 7 thereof, a piece of wire gauze or screen cloth 3ª being preferably arranged over the opening which the door 8 closes so as to prevent dust and dirt from entering the compartment B. Each of the exhaust flues 7 preferably consists of a permanent section that is connected to the floor of the compartment B, and a coöperating section 7ª connected to the radiating device 5 and arranged in telescopic engagement with the permanent section, thus enabling the heat-radiating device 5 to be removed easily, the floor of the compartment B being provided with hinged doors 9 and 10 that form closures for the flue 4 and the permanent sections of the exhaust flues 7, respectively, when the heat-radiating device 5 is not arranged in operative position.

If desired, the various parts of the heater can be made adjustable, as shown in Figs. 6 and 7, so that the heater can be applied easily to different kinds of vehicles. For example, the horizontal portion of the conduit A can consist of two telescoping sections 11 and 11ª that are clamped together by means of an adjustable band 12, and the laterally projecting portion of said conduit which carries the vertical flue 4, can also consist of two telescoping sections 13 and 13ª that are clamped together by a band 14 or other suitable device. The outer section 13ª is open at both ends so that the inner section 13 can be inserted in either end of same and thus enable the conduit A to be arranged on either the left- or right-hand side of the vehicle, said section 13ª, of course, being provided with a removable cap 15 that forms a closure for one end of same. The vertical flue 4 consists of telescoping sections 16 and 16ª that are clamped together by a device 17, and the downwardly projecting portion of the conduit A which carries the funnel 2, is also formed of telescoping sections 18 and 18ª that are clamped together by a device 19. A heater of the construction illustrated in Figs. 6 and 7 can be applied to various kinds of vehicles for the parts of the heater are so constructed that they can be adjusted to accommodate the exhaust pipe and other stationary parts of the vehicle or the propelling mechanism for same.

Figs. 8 and 9 illustrate a heater that embodies practically the same features as the heater shown in Figs. 1 to 5, inclusive, except that the horizontal portion of the conduit A is provided with a partition 20 that extends from the front end of same to a point adjacent the rear end so as to cause the current of air to travel rearwardly through the lower portion of the conduit and then upwardly and forwardly to the vertical flue 4 which leads to the heat-radiating device or to the compartment which is to be heated. The advantage of such a construction is that it can be applied to a vehicle in which the compartment to be heated is located quite near the front of the vehicle.

Instead of using a cylindrical-shaped heat-radiating device of the construction previously referred to, I can use a flat hollow radiating device 21 that covers the main portion of the floor of the compartment B of the vehicle, as shown in Figs. 10, 11 and 12. The flue 4 communicates with the front end of said device, and said device is provided with exhaust flues 7 of substantially the same construction as those previously referred to. Partitions 22 are arranged inside of the device 21 so as to cause the air to circulate rearwardly and then forwardly through the device 21, as indicated by the dotted arrows shown in Fig. 10, and, if desired, a register 23 or other suitable member can be arranged in the top wall of the device 21 so as to permit the heated air to escape directly into the compartment B.

A vehicle heater of the construction above described can be operated without cost owing to the fact that the heat-generating means consists of the exhaust pipe that leads from the engine which propels the vehicle. The current of air which travels adjacent said exhaust pipe becomes heated to a high degree and thus keeps the compartment B of the vehicle comfortable even in severe weather. The heater is of such simple construction that it can be manufactured at a low cost and it is not apt to get out of order, and when the various parts of the heater are made adjustable, as shown in Figs. 6 and 7, the heater can be applied practically to any kind of a vehicle that is propelled by an engine. In warm or mild weather the heat-radiating device that is arranged inside of the compartment can be removed bodily and without necessitating the removal of the conduit A and the exhaust flues which are located underneath the floor of the vehicle.

Having thus described my invention, what I claim as new and desire to secure by Letters Patent is:

A vehicle heater comprising a hollow heat-radiating device arranged in a compartment of the vehicle and provided with exhaust flues that communicate with the atmosphere, a conduit arranged under the floor of the vehicle and communicating with said device, the front end of said conduit being open so that air can travel through same, an engine exhaust pipe projecting into said conduit for heating the air that travels through same, and means for permitting the heated air to pass from said heat-radiating device into the compartment of the vehicle in which it is arranged.

In testimony whereof I hereunto affix my signature in the presence of two witnesses, this twenty-eighth day of January 1910.

GEORGE S. JOHNSTON.

Witnesses:
 WELLS L. CHURCH,
 GEORGE BAKEWELL